US009286801B2

(12) United States Patent
Kummamuru et al.

(10) Patent No.: US 9,286,801 B2
(45) Date of Patent: Mar. 15, 2016

(54) LEVERAGING INFORMATION FOR USE IN A TRAFFIC PREDICTION SCENARIO

(71) Applicant: International Business Machines Corporation, Armonk, NY (US)

(72) Inventors: Krishna Kummamuru, Bangalore (IN); Nitendra Rajput, Gurgaon (IN); Biplav Srivastava, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 13/786,765

(22) Filed: Mar. 6, 2013

(65) Prior Publication Data

US 2014/0257681 A1   Sep. 11, 2014

(51) Int. Cl.
| | |
|---|---|
| G08G 1/123 | (2006.01) |
| G08G 1/127 | (2006.01) |
| G08G 1/00 | (2006.01) |
| G06Q 10/00 | (2012.01) |
| G06Q 10/04 | (2012.01) |
| G06Q 50/30 | (2012.01) |

(52) U.S. Cl.
CPC .............. *G08G 1/123* (2013.01); *G06Q 10/047* (2013.01); *G08G 1/00* (2013.01); *G08G 1/127* (2013.01); *G06Q 10/00* (2013.01); *G06Q 10/04* (2013.01); *G06Q 50/30* (2013.01)

(58) Field of Classification Search
CPC ....... G08G 1/123; G08G 1/127; G06Q 10/04; G06Q 10/047; G06Q 50/30; G06Q 50/32
See application file for complete search history.

(56) References Cited

U.S. PATENT DOCUMENTS

| | | | | |
|---|---|---|---|---|
| 6,453,298 | B2* | 9/2002 | Murakami et al. ............ | 701/117 |
| 7,080,026 | B2 | 7/2006 | Singh et al. | |
| 7,269,505 | B2* | 9/2007 | Zhao et al. ..................... | 701/533 |
| 7,609,176 | B2* | 10/2009 | Yamane ............... | G08G 1/0104 |
| | | | | 701/423 |
| 7,698,055 | B2* | 4/2010 | Horvitz ................ | G08G 1/0104 |
| | | | | 701/117 |
| 7,739,040 | B2 | 6/2010 | Horvitz | |
| 7,840,427 | B2* | 11/2010 | O'Sullivan ............. | G08G 1/123 |
| | | | | 701/465 |
| 7,849,031 | B2* | 12/2010 | Stehle et al. .................... | 706/21 |

(Continued)

FOREIGN PATENT DOCUMENTS

| | | |
|---|---|---|
| CN | 102496130 A | 6/2012 |
| WO | 2011125059 A2 | 10/2011 |

OTHER PUBLICATIONS

Arun Kumar et al, WWTW: The World Wide Telecom Web, Aug. 27, 2007, NSDR '07, ACM 978-1-59593-787-2/07/0008, pp. 1 thru 6.*

(Continued)

*Primary Examiner* — Tuan C. To
*Assistant Examiner* — Dale W Hilgendorf
(74) *Attorney, Agent, or Firm* — Ryan, Mason & Lewis, LLP

(57) ABSTRACT

Techniques, systems, and articles of manufacture for leveraging information for use in a traffic prediction scenario. A method includes extracting transportation-related information pertaining to a geographic region from multiple user-driven information systems, processing said transportation-related information by merging the transportation-related information across the multiple user-driven information systems and one or more transportation-related databases, and determining a supply and demand estimation for one or more aspects of transportation in the geographic region based on said processing of said transportation-related information.

12 Claims, 5 Drawing Sheets

(56) References Cited

U.S. PATENT DOCUMENTS

| | | | |
|---|---|---|---|
| 7,928,864 B2 | 4/2011 | Park | |
| 8,000,892 B2 | 8/2011 | Banerjee | |
| 8,041,660 B2 * | 10/2011 | Stehle et al. | 706/14 |
| 8,260,650 B2 * | 9/2012 | Miller | G06Q 10/04 705/7.22 |
| 8,494,991 B2 * | 7/2013 | Stehle et al. | 706/14 |
| 2006/0184314 A1 | 8/2006 | Couckuyt et al. | |
| 2008/0195428 A1 | 8/2008 | O'Sullivan | |
| 2009/0167513 A1 * | 7/2009 | Hill et al. | 340/435 |
| 2011/0261202 A1 * | 10/2011 | Goldstein | 348/149 |
| 2012/0173136 A1 | 7/2012 | Ghoting et al. | |
| 2012/0290652 A1 * | 11/2012 | Boskovic | 709/204 |
| 2012/0296885 A1 | 11/2012 | Gontmakher et al. | |

OTHER PUBLICATIONS

Jongo et al., Overview of Mobile Passenger Information Systems in Public Transport, Dec. 22, 2010.

Ben-Akiva et al., Real Time Simulation of Traffic Demand-Supply Interactions Within DynaMIT. Mar. 1, 2000.

Auto Travel Alert and Navigation, IPCOM00020178ID, Nov. 23, 2010.

Anderson et al., Building a Transportation Information System Using Only GPS and Basic SMS Infrastructure. Sep. 22, 2008.

Method and System for Managing and Disseminating Traffic Predictions to Travelers Based on Observed and Learned Travel Patterns, IPCOM000216282D, Mar. 28, 2012.

Usue. A Review of Travel Time Estimation and Forecasting for Advanced Traveler Information Systems, Sep. 14, 2012.

Peeta et al., Foundation of Dynamic Traffic Assignment: The past, the present and the future, Networks and Spatial Economics, 2001.

Farsi et al., Cost Efficiency in Regional Bus Companies: An Application of Alternative Stochastic Frontier Models, Department of Economics, University of Lugano, Via Maderno 24, 6900 Lugano, Switzerland, Jul. 2004.

Daamen, Modeling Passenger Flows in Public Transport Facilities, PhD Thesis, TU Deft, Sep. 9, 2004.

Disha. Disha on DIMTS, downloaded Feb. 12, 2013.

Mumbai Navigator: http//www.cse.iitb.ac.in/navigator1/index.html downloaded Feb. 12, 2013.

Go4Mumbai (portal)—A http://www.go4mumbai.com downloaded Feb. 12, 2013.

Spoken Web http://researcher.watson.ibm.com/researcher/view_project.php?id=2997 downloaded Feb. 20, 2013.

* cited by examiner

LEVERAGING INFORMATION FOR USE IN A TRAFFIC PREDICTION SCENARIO

FIELD OF THE INVENTION

Embodiments of the invention generally relate to information technology, and, more particularly, to transportation management.

BACKGROUND

Predicting transportation supply (that is, the availability of buses, taxis, etc.) and transportation demand (that is, the number of potential passengers or travelers) in a real-world scenario is a complex and challenging task. Traffic information systems provide information about current traffic situations and what commuters or travelers can potentially do in hopes of accomplishing their travel needs. Such existing approaches include applying sensors (such as global positioning system (GPS) sensors) to vehicles. Additionally, users can provide information such as traffic counts and speed, location of vehicles and users, etc. However, such information is often incomplete, as it does not provide additional context such as latent traffic demand and supply, the number of commuters likely to take a particular route, the number of vehicles that effectively become available at a location for a destination at a particular time of day, etc. Accordingly, a need exists for the implementation of techniques that optimize resources to more accurately predict traffic events and conditions.

SUMMARY

In one aspect of the present invention, techniques for leveraging information for use in a traffic prediction scenario are provided. An exemplary computer-implemented method can include steps of extracting transportation-related information pertaining to a geographic region from multiple user-driven information systems, processing said transportation-related information by merging the transportation-related information across the multiple user-driven information systems and one or more transportation-related databases, and determining a supply and demand estimation for one or more aspects of transportation in the geographic region based on said processing of said transportation-related information.

In another aspect of the invention, an exemplary computer-implemented method can include steps of extracting transportation-related information pertaining to a geographic region from multiple user-driven information systems according to a data model, and processing said transportation-related information by merging the transportation-related information across the multiple user-driven information systems and one or more transportation-related databases and identifying one or more information units in the merged transportation-related information. The method also includes determining a supply and demand estimation for each one of multiple aspects of transportation in the geographic region based on said processing of said transportation-related information, and generating a supply and demand estimation output in response to a query, wherein said generating comprises filtering the determined supply and demand estimations for the multiple aspects of transportation in the geographic region based one or more specified parameters.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes extracting information from user-driven sources in a traffic prediction scenario. At least one embodiment of the invention includes providing a mechanism to determine the supply and demand of public transportation systems by analyzing data from sources (such as, for example, transportation voice sites). Such data can be adapted to estimate latent demand and supply. By way of illustration of the concepts of latent demand and latent supply, consider the following examples. If supply is increased due to, for instance, the building of a new lane on a road or the building of a new bridge, latent demand may subsequently negate the benefits. Similarly, if demand is increased due to, for instance, a travel provider offering discounts, latent supply may absorb the increase in demand and thus lead to more optimized operations.

Accordingly, an aspect of the invention includes designing and providing a mechanism that estimates the latent supply and latent demand of public transportation systems by analyzing data from user-driven sources. Such information analysis can provide and leverage information that cannot be obtained by standard sensors. As a result, traffic predictions generated via the use of such data can be carried out ahead of time, and, as such, one or more embodiments of the invention can include performing optimizations during real-time operation of the available public transportation vehicles.

Example users such as transit authorities (bus operators, metro operators, etc.), para-transit companies (shuttles, taxis, autos, etc.), and individual travelers can potentially utilize and benefit from the traffic predictions generated via techniques detailed herein. Additionally, in at least one embodiment of the invention, supply and demand data can be used to commission and/or generate targeted advertisements for transportation vehicles such as private taxis, and/or for separate enterprises.

Figure 1:
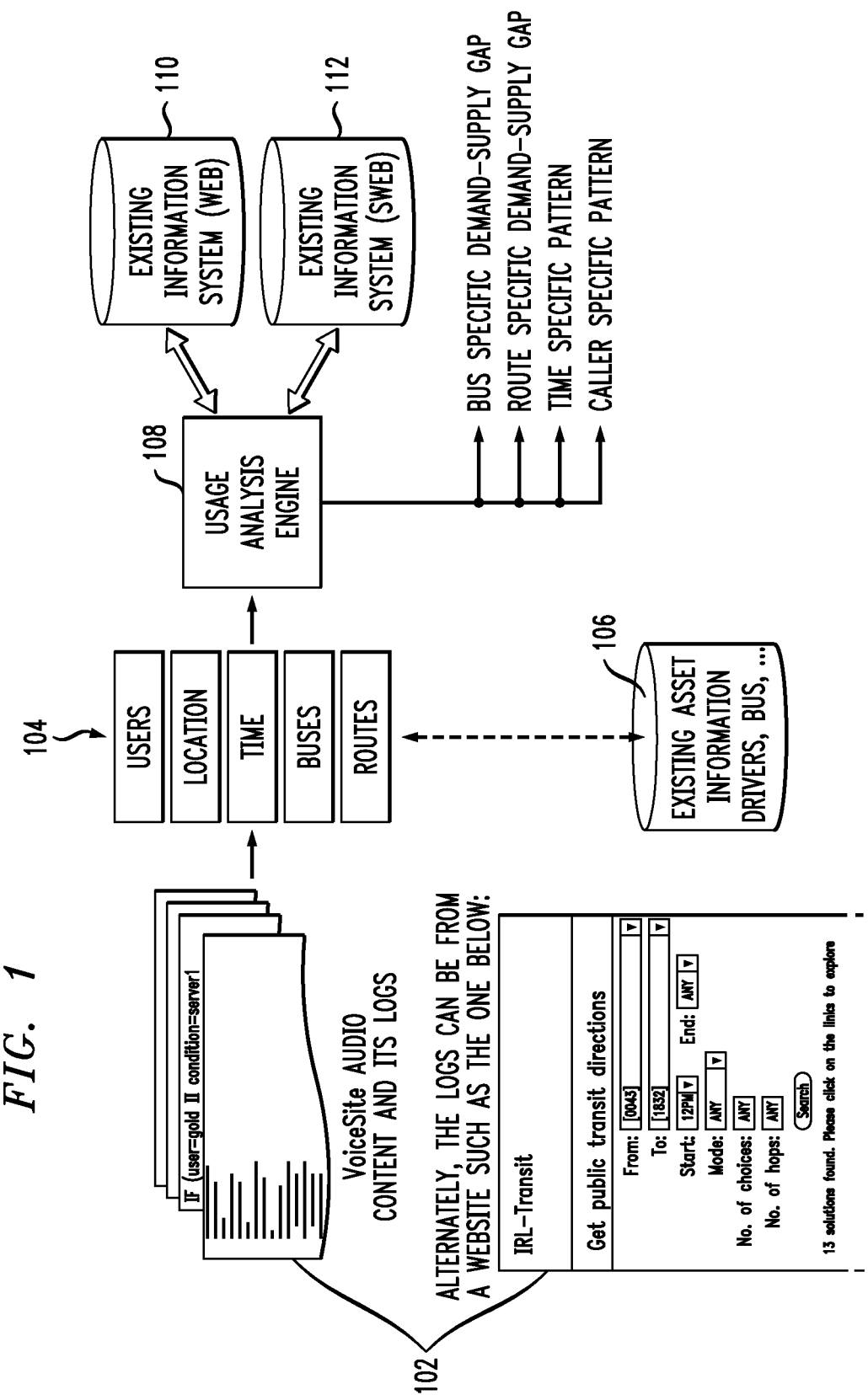
FIG. 1 is a block diagram illustrating an example embodiment, according to an aspect of the invention.

FIG. 1 is a block diagram illustrating an example embodiment, according to an aspect of the invention. By way of illustration, FIG. 1 depicts information systems 102 such as websites, voice sites, and/or other applications that provide dynamic transportation information 104. An example of a voice site or a website might include a site that provides information on the availability of a transportation vehicle to commute from a given place to another place at a given time of day. Another example can include a voice site and/or website that provide routing information of a particular mode of transportation between two given points.

By way of example, such information systems can include voice site audio content and corresponding logs, and/or logs derived from one or more websites. The logs of voice sites and/or web sites are stored in a web server, and the log information can be obtained via various methods such as via use of hypertext transfer protocol (HTTP) or file transfer protocol (FTP). Additionally, the transportation information 104 can include information pertaining, for example, to users, locations, times, vehicles (buses, trains, taxis, etc.) and vehicle transportation routes. For example, the logs from a voice site may contain the telephone number from which a user accessed the voice site, the location of the telephone, the time of access, and the details of the information queried by the user.

As described herein, such information 104 can be mapped to a traffic domain model that is based on existing information such as from asset information database 106, web information system database 110 and Spoken Web (Sweb) information system database 112 (which contains the database used by voice sites). As described in additional detail in FIG. 2, this mapping is carried out by a usage analysis engine 108 to determine assessments and/or predictions for various traffic scenarios such as vehicle-specific supply/demand gaps, route-specific supply/demand gaps, time-specific patterns, user-specific patterns, etc.

By way of example, the usage analysis engine 108 can determine the number of requests that people have made for a particular vehicle (bus, train, etc.) and/or transportation route, wherein a higher number of requests will indicate a higher demand and likely a higher latent demand. Additionally, the usage analysis engine 108 can determine the routes and/or vehicles for which users most frequently query, which can provide information about which vehicles and routes are routinely most popular with users. Also, for example, the usage analysis engine 108 can determine one or more times of day when transportation requests change, which can provide information pertaining to the daily, weekly and/or monthly patterns for different users, vehicles and/or routes. Further, by way of example, the usage analysis engine 108 can determine if transportation requests or queries are tied to a particular driver or vehicle operator, as opposed to being tied to a vehicle or route, which can help in detecting particularly skilled (or troublesome) operators, as well as potentially aiding in detecting particularly popular (or troublesome) vehicles or routes.

Figure 2:
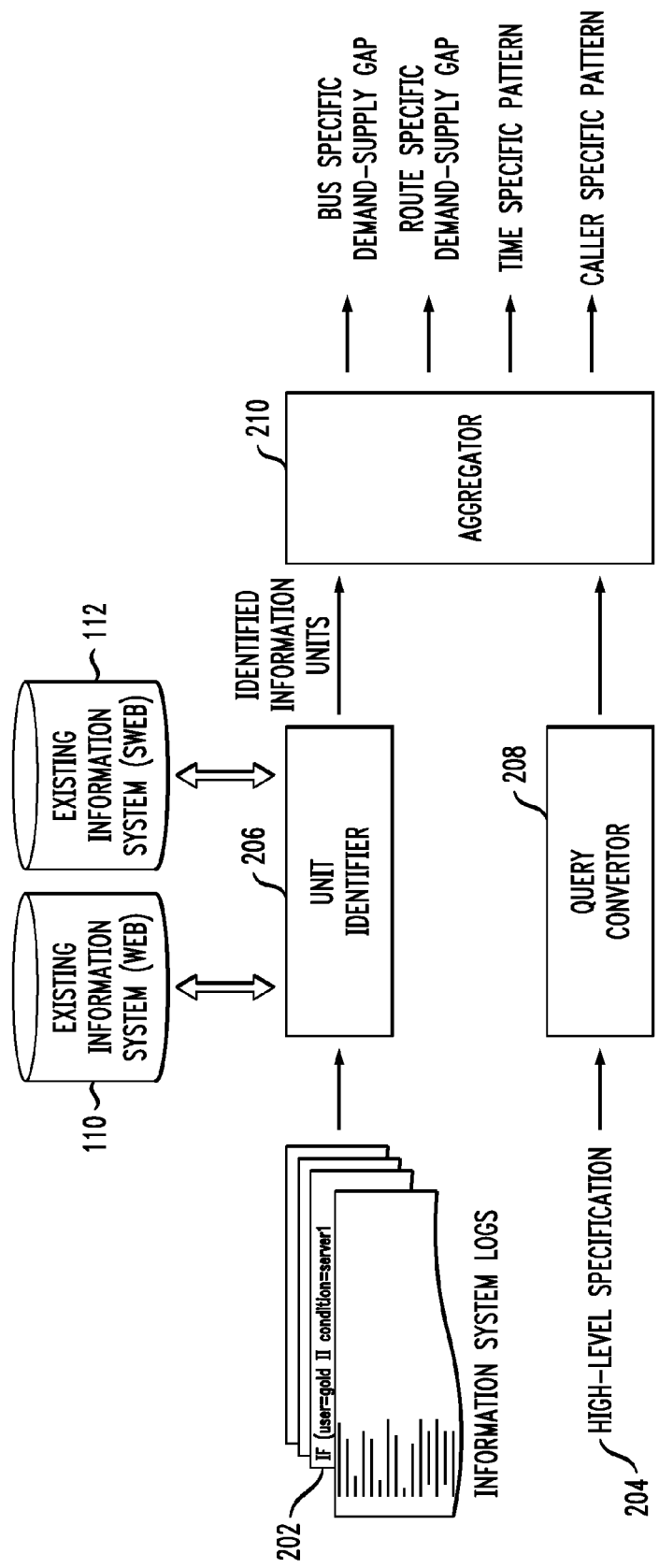
FIG. 2 is a block diagram illustrating an example embodiment, according to an aspect of the invention.

FIG. 2 is a block diagram illustrating an example embodiment, according to an aspect of the invention. Specifically, FIG. 2 illustrates components of the usage analysis engine 108 (as detailed in FIG. 1) including a unit identifier component 206, a query convertor component 208 and an aggregator component 210. For example, the unit identifier 206 takes information system logs 202 (such as from voice sites and/or websites) and derives information (such as information 104 as detailed in FIG. 1) according to a data model. An example data model can include the details of data captured with respect to the users, routes, individual vehicles, etc. Details of a route can include, for example, the global positioning system (GPS) locations of all bus stops along the route, the bus numbers that operate on the route, the frequency of the buses along the route, etc.

Additionally, the unit identifier 206 can identify information units by analyzing the noted information as well as data from existing databases (such as databases 110 and 112 detailed in FIG. 1) through several lenses or dimensions (for example, via a table) and storing the identified unit information in different, appropriate, formats (such as extensible markup language (XML), for example). Information units, as used herein, refer to entities such as users, routes, etc., as detailed above. Additionally, the unit identifier 206 analyzes system log information via extraction with standard expressions and/or more advanced information extraction techniques. Lenses or dimensions, as used herein, can include parameters such as, for example, time, location, services, and consumer.

The unit identifier additionally transmits identified information units to the aggregator component 210. Accordingly, the aggregator component 210 can aggregate the unit information as well as any additionally received transportation-related information based on filtering criteria to determine supply and demand information for one or more transportation scenarios. By way of example, supply and demand information determined by the aggregator component 210 can include transportation information pertaining to certain parameters such as, for example, a time parameter (hourly, daily, weekly, etc.), a location parameter (by district, by route, etc.), a service parameter (public transportation, metro only, etc.) and a consumer parameter (tourists, train passengers, bus passengers, etc.). As noted in FIG. 2, example conclusions derived on information pertaining to these parameters might include bus-specific demand-supply gaps, route-specific demand-supply gaps, time-specific patterns, caller-specific patterns, etc.

Additionally, in connection with the aggregator component 210, filtering criteria for queries on aggregated data can include multiple levels of a supply and demand gap. For example, aggregation can occur at a route level, an individual bus-trip level, a level indicating supply/demand at a bus-stop, etc. Also, data obtained, for example, in the form of a high-level specification 204, can be converted to a query by query converter 208 and ultimately provided to the aggregator component 210. High-level specification 204 of a question or query might include an example such as, "What is the demand at a given bus-stop for a specified bus-route?" The query converter 208 then converts this high-level specification into a database query.

As also depicted in FIG. 2, the aggregator component 210 determines and outputs assessments and/or predictions for various traffic scenarios such as (as noted above) vehicle-specific supply/demand gaps, route-specific supply/demand gaps, time-specific patterns, user-specific patterns, etc. By way of example, there can be one or multiple consumers for the outputs. Such consumers might include, for instance, bus or taxi operators, traffic police, commuters, etc. In accordance with at least one embodiment of the invention, the specific output format can depend on the corresponding consumer.

Figure 3:
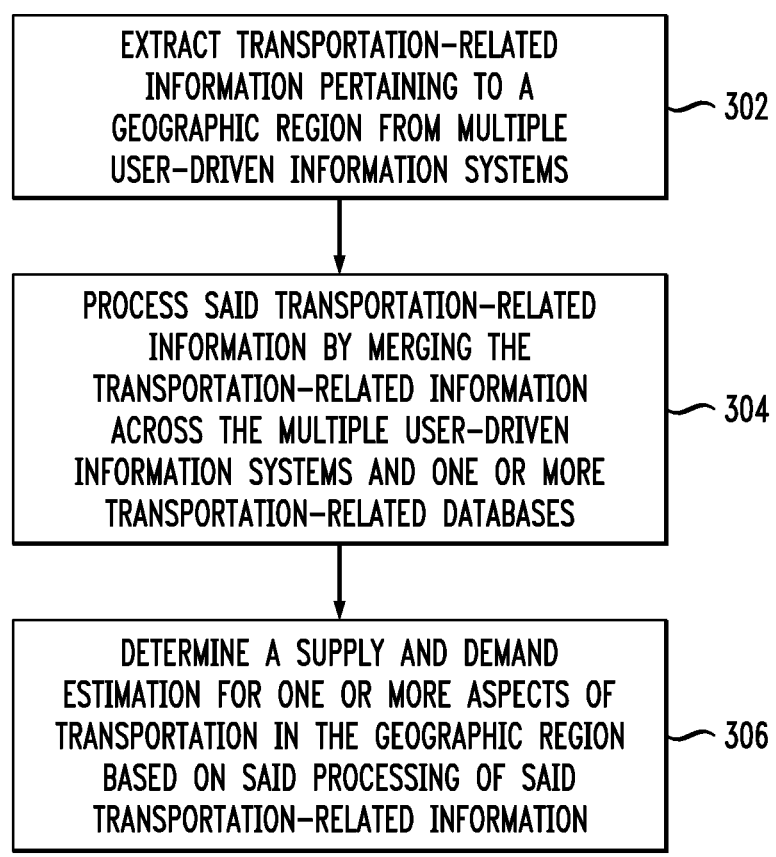
FIG. 3 is a flow diagram illustrating techniques according to an embodiment of the invention.

FIG. 3 is a flow diagram illustrating techniques according to an embodiment of the present invention. Step 302 includes extracting transportation-related information pertaining to a geographic region from multiple user-driven information systems. Such systems can include for example, a transportation-related voice site, a transportation-related website, and/or an application that provides information of available transportation services over a voice channel and/or a mobile data channel. Also, such transportation-related information can include, for example, a log derived from a user-driven information system, audio content derived from a user-driven information system, as well as information pertaining to vehicle operators, locations, times, vehicles and/or transportation routes.

Step 304 includes processing said transportation-related information by merging the transportation-related information across the multiple user-driven information systems and one or more transportation-related databases. This processing step can include analyzing extracted transportation-related information with a focus on a given vehicle, a given vehicle operator, and/or a given transportation route.

Step 306 includes determining a supply and demand estimation for one or more aspects of transportation in the geographic region based on said processing of said transportation-related information. This determining step can include determining a gap in supply and demand for a particular vehicle, transportation route, and/or vehicle operator, by determining a number of queries directed to the vehicle, transportation route, and/or vehicle operator, as derived from the extracted transportation-related information. Additionally, the determining step can include determining one or more times of day when transportation requests change by determining a temporal aspect of transportation requests, as derived from the extracted transportation-related information. Further, the techniques depicted in FIG. 3 can also include generating a traffic assessment and/or prediction based on said determined supply and demand estimation.

Figure 4:
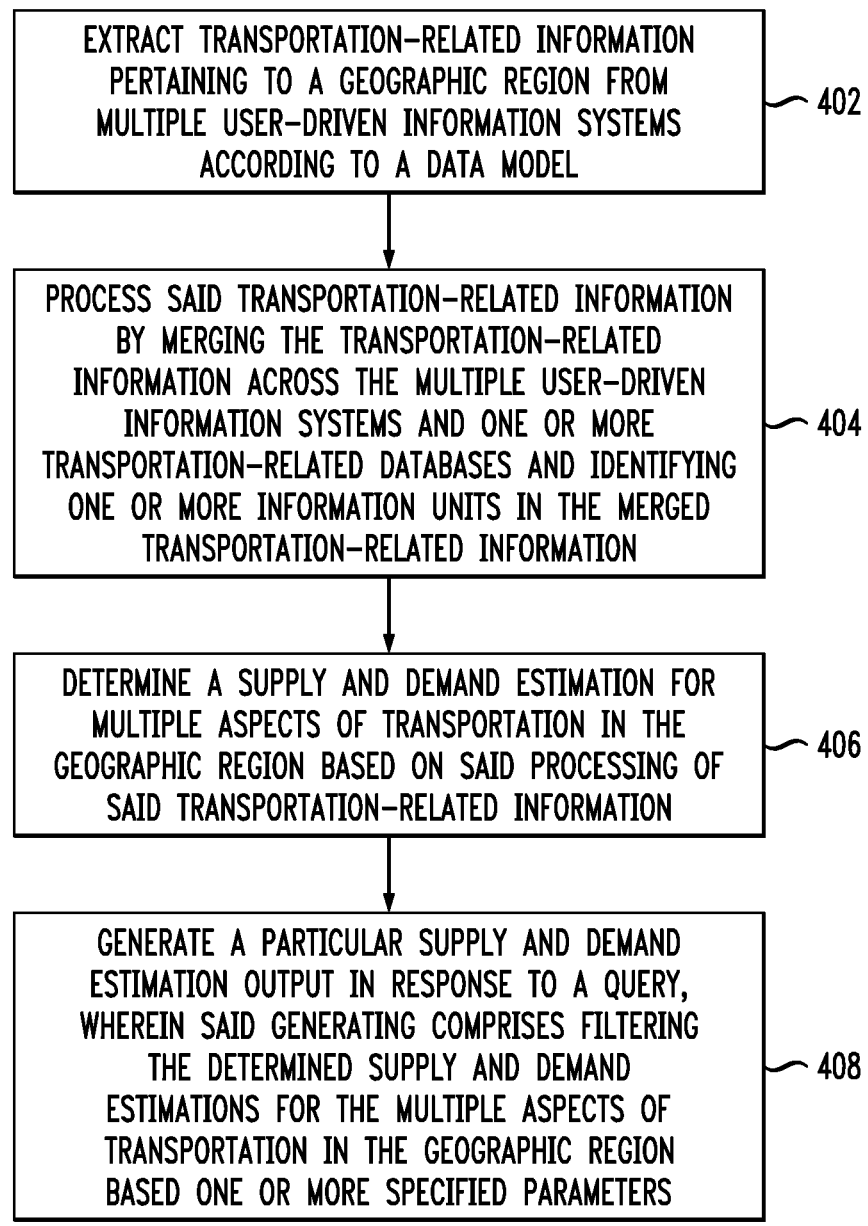
FIG. 4 is a flow diagram illustrating techniques according to an embodiment of the invention.

FIG. 4 is a flow diagram illustrating techniques according to an embodiment of the invention. Step 402 includes extracting transportation-related information pertaining to a geographic region from multiple user-driven information systems according to a data model. Step 404 includes processing said transportation-related information by merging the transportation-related information across the multiple user-driven information systems and one or more transportation-related databases and identifying one or more information units in the merged transportation-related information.

Step 406 includes determining a supply and demand estimation for each one of multiple aspects of transportation in the geographic region based on said processing of said transportation-related information. Step 408 includes generating a particular supply and demand estimation output in response to a query, wherein said generating comprises filtering the determined supply and demand estimations for the multiple aspects of transportation in the geographic region based on one or more specified parameters.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
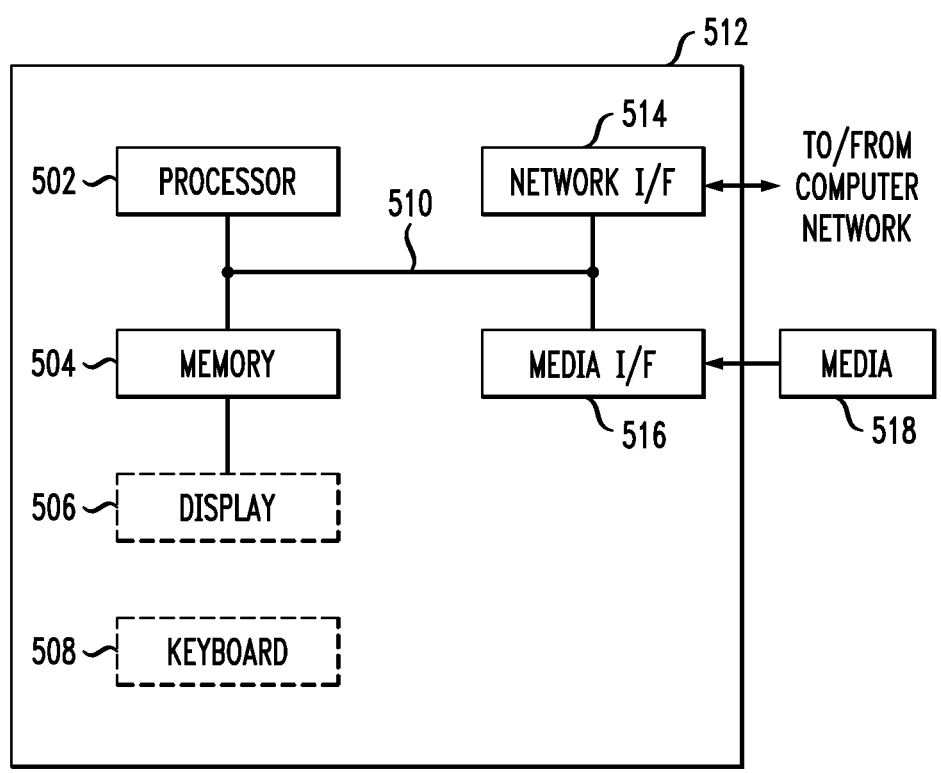
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software can include, but is not limited to, firmware, resident software, microcode, etc.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, carrying out traffic predictions in advance so as to provide the public with improved and more accurate information regarding the supply and demand of public transportation parameters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   extracting transportation-related information pertaining to a geographic region from multiple user-driven information systems comprising at least (i) one or more transportation-related voice sites on the world wide telecom web and (ii) one or more transportation-related sites on the world wide web;
   processing said transportation-related information by merging the transportation-related information across the multiple user-driven information systems and one or more transportation-related databases;
   determining a supply and demand estimation for multiple aspects of transportation in the geographic region based on said processing of said transportation-related information, wherein said determining the supply and demand estimation comprises:
   determining the number of queries directed to each of a plurality of vehicles;
   determining the number of queries directed to each of a plurality of transportation routes; and
   determining the number of queries directed to each of a plurality of vehicle operators;
   determining a latent supply and latent demand estimation for the multiple aspects of transportation in the geographic region based on said processing of said transportation-related information;
   generating a traffic assessment and/or prediction based on (i) said determined supply and demand estimation and (ii) said determined latent supply and latent demand estimation; and
   outputting the traffic assessment and/or prediction as a visual output and/or an audio output.

2. The method of claim 1, wherein the user-driven information systems comprise an application that provides information of available transportation services over a voice channel and/or a mobile data channel.

3. The method of claim 1, wherein said determining the supply and demand estimation comprises determining one or more times of day when transportation requests change by determining a temporal aspect of transportation requests, as derived from the extracted transportation-related information.

4. The method of claim 1, wherein said processing comprises analyzing said extracted transportation-related information with a focus on a given vehicle.

5. The method of claim 1, wherein said processing comprises analyzing said extracted transportation-related information with a focus on a given vehicle operator.

6. The method of claim 1, wherein said processing comprises analyzing said extracted transportation-related information with a focus on a given transportation route.

7. The method of claim 1, wherein said transportation-related information comprises a log derived from the user-driven information systems.

8. The method of claim 1, wherein said transportation-related information comprises audio content derived from the user-driven information systems.

9. The method of claim 1, wherein said transportation-related information comprises information pertaining to vehicle operators, locations, times, vehicles and/or transportation routes.

10. An article of manufacture comprising a non-transitory computer readable storage medium having computer readable instructions tangibly embodied thereon which, when implemented, cause a computer to carry out a plurality of method steps comprising:
    extracting transportation-related information pertaining to a geographic region from multiple user-driven information systems comprising at least (i) one or more transportation-related voice sites on the world wide telecom web and (ii) one or more transportation-related sites on the world wide web;
    processing said transportation-related information by merging the transportation-related information across the multiple user-driven information systems and one or more transportation-related databases;
    determining a supply and demand estimation for multiple aspects of transportation in the geographic region based on said processing of said transportation-related information, wherein said determining the supply and demand estimation comprises:
  determining the number of queries directed to each of a plurality of vehicles;
  determining the number of queries directed to each of a plurality of transportation routes; and
  determining the number of queries directed to each of a plurality of vehicle operators;
determining a latent supply and latent demand estimation for the multiple aspects of transportation in the geographic region based on said processing of said transportation-related information;
generating a traffic assessment and/or prediction based on (i) said determined supply and demand estimation and (ii) said determined latent supply and latent demand estimation; and
outputting the traffic assessment and/or prediction as a visual output and/or an audio output.

11. A system comprising:
a memory; and
at least one processor coupled to the memory and operative for:
  extracting transportation-related information pertaining to a geographic region from multiple user-driven information systems comprising at least (i) one or more transportation-related voice sites on the world wide telecom web and (ii) one or more transportation-related sites on the world wide web;
  processing said transportation-related information by merging the transportation-related information across the multiple user-driven information systems and one or more transportation-related databases;
  determining a supply and demand estimation for multiple aspects of transportation in the geographic region based on said processing of said transportation-related information, wherein said determining the supply and demand estimation comprises:
    determining the number of queries directed to each of a plurality of vehicles;
    determining the number of queries directed to each of a plurality of transportation routes; and
    determining the number of queries directed to each of a plurality of vehicle operators;
  determining a latent supply and latent demand estimation for the multiple aspects of transportation in the geographic region based on said processing of said transportation-related information;
  generating a traffic assessment and/or prediction based on (i) said determined supply and demand estimation and (ii) said determined latent supply and latent demand estimation; and
  outputting the traffic assessment and/or prediction as a visual output and/or an audio output.

12. A method comprising:
extracting transportation-related information pertaining to a geographic region from multiple user-driven information systems, comprising at least (i) one or more transportation-related voice sites on the world wide telecom web and (ii) one or more transportation-related sites on the world wide web, according to a data model;
processing said transportation-related information by merging the transportation-related information across the multiple user-driven information systems and one or more transportation-related databases, and identifying one or more information units in the merged transportation-related information;
determining a supply and demand estimation for each one of multiple aspects of transportation in the geographic region based on said processing of said transportation-related information, wherein said determining the supply and demand estimation comprises:
  determining the number of queries directed to each of a plurality of vehicles;
  determining the number of queries directed to each of a plurality of transportation routes; and
  determining the number of queries directed to each of a plurality of vehicle operators;
determining a latent supply and latent demand estimation for each one of the multiple aspects of transportation in the geographic region based on said processing of said transportation-related information;
generating a supply and demand estimation output in response to a query, wherein said generating comprises filtering (i) the determined supply and demand estimations and (ii) the determined latent supply and latent demand estimations for the multiple aspects of transportation in the geographic region based one or more specified parameters; and
outputting the supply and demand estimation output as a visual output and/or an audio output.

* * * * *